US011335908B2

(12) United States Patent
Kim et al.

(10) Patent No.: US 11,335,908 B2
(45) Date of Patent: May 17, 2022

(54) RECHARGEABLE METAL HALIDE BATTERY

(71) Applicant: International Business Machines Corporation, Armonk, NY (US)

(72) Inventors: Jangwoo Kim, San Jose, CA (US); Young-Hye Na, San Jose, CA (US); Robert D. Allen, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 293 days.

(21) Appl. No.: 16/525,642

(22) Filed: Jul. 30, 2019

(65) Prior Publication Data
US 2021/0036323 A1 Feb. 4, 2021

(51) Int. Cl.
*H01M 4/58* (2010.01)
*H01M 4/62* (2006.01)
*H01M 4/36* (2006.01)
*H01M 4/02* (2006.01)

(52) U.S. Cl.
CPC ........... *H01M 4/582* (2013.01); *H01M 4/366* (2013.01); *H01M 4/622* (2013.01); *H01M 4/625* (2013.01); *H01M 4/628* (2013.01); *H01M 2004/028* (2013.01); *H01M 2300/0028* (2013.01)

(58) Field of Classification Search
None
See application file for complete search history.

(56) References Cited

U.S. PATENT DOCUMENTS

| 4,296,185 | A | 10/1981 | Catanzarite |
| 9,461,349 | B2 | 10/2016 | Mizuno et al. |
| 9,893,383 | B2 | 2/2018 | Raub et al. |
| 2009/0061315 | A1* | 3/2009 | Nakano .............. H01M 4/1393 429/218.1 |
| 2012/0321911 | A1 | 12/2012 | Watanabe et al. |
| 2013/0224535 | A1 | 8/2013 | Matsuoka et al. |
| 2015/0147673 | A1 | 5/2015 | Li et al. |
| 2016/0248115 | A1 | 8/2016 | Hatta et al. |
| 2017/0033350 | A1* | 2/2017 | Mizuno ................. H01M 4/483 |
| 2017/0207475 | A1 | 7/2017 | Ito |
| 2017/0352936 | A1* | 12/2017 | Jin ....................... H01M 12/065 |
| 2019/0221887 | A1* | 7/2019 | Kim ................. H01M 10/0569 |
| 2021/0257702 | A1* | 8/2021 | Sugimori ............ H01M 50/431 |

FOREIGN PATENT DOCUMENTS

| CN | 104916810 A | 9/2015 |
| WO | 2010005686 A2 | 1/2010 |

OTHER PUBLICATIONS

International Search Report and Written Opinion dated Sep. 29, 2020, for PCT/IB2020/055606 (filed Jun. 16, 2020).
(Continued)

*Primary Examiner* — Carmen V Lyles-Irving
(74) *Attorney, Agent, or Firm* — Karen Canaan; CanaanLaw, P.C.

(57) ABSTRACT

A battery includes an anode, an electrolyte including a solvent and at least one ion conducting salt, and a cathode including a metal halide salt incorporated into an electrically conductive material. The electrolyte is in contact with the anode, the cathode, and an oxidizing gas.

24 Claims, 4 Drawing Sheets

(56) References Cited

OTHER PUBLICATIONS

Kim et al., "Reduced Graphene Oxide/LiI Composite Lithium Ion Battery Cathodes", Published Oct. 20, 2017, Nano Lett. 2017, 17, 6893-6899, 7 pgs.

Wang et al., "Fixing of high soluble Br2/Br- in porous carbon as cathode material for rechargeable lithium ion batteries," Jan. 2012, Journal of Materials Chemistry A, 5 pgs.

Wu et al., LiI embedded meso-micro porous carbon polyhedrons for lithium iodine battery with superior lithium storage properties, Aug. 2017, Energy Storage Materials 10 (2018) 62-68, 7 pgs.

Zhao et al., A 3.5 V Lithium—Iodine Hybrid Redox Battery with Vertically Aligned Carbon Nanotube Current Collector, Published Jan. 29, 2014, Nano Lett. 2014, 14, 1085-1092, 8 pgs.

* cited by examiner

RECHARGEABLE METAL HALIDE BATTERY

BACKGROUND

Rechargeable batteries are used as a power source in a wide range of applications such as, for example, industrial devices, medical devices, electronic devices, electric vehicles, and grid energy storage systems. Battery technology is continually being developed to enable higher energy density and greater efficiency, which makes it possible to use batteries as power sources for additional applications.

The need for high specific capacities and specific energies has led to the study of various metal-element batteries. Lithium intercalation cathode materials, such as lithium nickel manganese cobalt oxide (NMC), lithium nickel cobalt aluminum oxide (NCA), lithium cobalt oxide (LCO), lithium iron phosphate (LFP), and the like have relatively low energy densities and may be expensive. To identify new and more efficient cathode materials, conversion cathode materials such as sulfur, oxygen, air, and others have been investigated.

Batteries made with lithium-oxygen, lithium-air, and lithium with other gas mixtures containing oxygen have excellent performance due at least in part to the low atomic number, low density, and high reducing capability of elemental lithium. Moreover, a lithium-oxygen battery could potentially have a theoretical specific energy three to five times greater than conventional lithium ion batteries.

Lithium metal has a high energy storage capacity and has been utilized as a primary battery anode material. In some cases, lithium metal anodes can form dendrites, which can cause short circuits during cell operation. It has also proven difficult to find reasonably inexpensive cathode materials that can accommodate the large amount of lithium ions and electrons extracted from a lithium metal anode.

SUMMARY

In general, the present disclosure is directed to a rechargeable lithium battery with an active cathode material including a solid phase metal halide. In various embodiments, the solid phase metal halide can be deposited on or within, or incorporated into, an electrically conductive material to form a cathode for the battery. Applying the metal halide on or into the cathode can reduce the amount of electrolyte needed in a battery and increase the amount of cathode material in a given enclosed cell volume, which can enhance cell level energy density. Batteries including the solid phase metal halide active cathode material require no heavy metals such as cobalt or nickel, which can reduce overall cell manufacturing costs. The improved cell level energy density makes possible the use of the battery in a wide range of applications including, for example, long-range electric vehicles (EV).

In one aspect, the present disclosure is directed to a battery including an anode, an electrolyte including a solvent and at least one ion conducting salt, and a cathode including a metal halide salt incorporated into an electrically conductive material, wherein the electrolyte is in contact with the anode, the cathode, and an oxidizing gas.

In another aspect, the present disclosure is directed to a battery, including:
  (a) an anode that takes up metal ions from an electrolyte during charging, and releases the ions to the electrolyte during discharging, the electrolyte including a solvent and an ion conducting salt;
  (b) a solid electrolyte interphase (SEI) layer contacting the anode, the SEI layer including an oxide of the metal ions; and
  (c) a cathode comprising a matrix of an electrically conductive porous material and a metal halide interspersed in the matrix, wherein the total amount of the metal halide in the cathode exceeds the amount of the metal halide that is dissolvable in the electrolyte.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

Like symbols in the figures indicate like elements.

DETAILED DESCRIPTION

Figure 1:
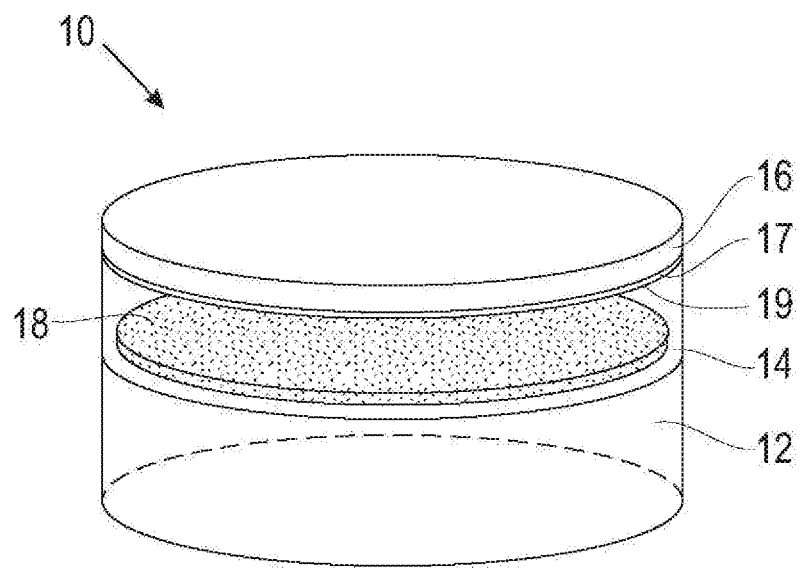
FIG. 1 is a conceptual diagram illustrating an example battery including an anode, an electrolyte, a cathode, and an optional separator.

FIG. 1 is a conceptual diagram illustrating an example battery 10 including an anode 12, an electrolyte 14, a cathode 16, and an optional separator 18. The battery 10 operates via reduction-oxidation (redox) reactions and utilizes different oxidation states and redox reactions of one or more components or elements for charge and discharge.

In some embodiments, the anode 12 is a metal, and suitable examples include, but are not limited to, lithium, magnesium, sodium, zinc, aluminum, and mixtures and combinations thereof. In some examples, the anode 12 consists essentially of elemental lithium, magnesium, zinc, aluminum, or sodium, or alloys thereof. In some embodiments, the anode 12 consists of elemental lithium, magnesium, sodium, zinc, aluminum, or lithium. In the present application, a component consisting of a particular material may in some cases include incidental impurities.

In some embodiments, the anode 12 is a carbon material, and suitable examples include, but are not limited to, graphite, graphene, graphene oxide, carbon black, and mixtures and combinations thereof. In some examples, the anode 12 consists essentially of graphite, graphene, graphene oxide, or carbon black, or graphite, or graphene, or graphene oxide, or carbon black mixed with one or more additional material. In some embodiments, the anode 12 consists of graphite, graphene, graphene oxide, or carbon black.

In other embodiments, the anode 12 is a metalloid, and suitable examples include, but are not limited to, silicon, germanium, antimony, and mixtures and combinations thereof. In some examples, the anode 12 consists essentially of elemental silicon, germanium, or antimony, or silicon, or germanium, or antimony alloyed with one or more additional elements. In some embodiments, the anode 12 consists of elemental silicon, germanium, or antimony.

The anode 12 takes up metal ions from the electrolyte 14 during charging and releases the metal ions to electrolyte 14 during discharging. In some embodiments, the anode 12 may be an intercalation host material capable of taking up metal ions. In some examples, a solid electrolyte interphase (SEI) layer may be in contact with the anode 12. For example, the SEI layer may include an oxide of a metal from the electrolyte 14.

The electrolyte 14, which may be aqueous or non-aqueous, and includes a solvent and at least one ion conducting salt that dissociates into a respective metal ion and a respective counter anion. In some examples, which are not intended to be limiting, the metal ion includes at least one of Li, Mg, Zn, Al and Na, and the counter anion includes one or more of nitrate ($NO_3^-$), hexafluorophosphate ($PF_6^-$), tetrafluoroborate ($BF_4^-$), bisoxalato borate ($BOB^-$), difluorooxalato borate ($DFOB^-$), trifluoromethanesulfonate ($TF^-$), and trifluorosulfonylimide ($TFSI^-$).

In some embodiments, the electrolyte 14 also includes an optional metal halide (e.g., $MX_n$, where M is a metal, X is a halogen, and n is an integer greater than 0). In some examples, the metal halide includes an electrolyte salt that dissociates into a respective halide ion and a respective metal ion. For example, the metal halide may dissolve in the solvent including the heterocyclic compound and dissociate into the respective metal and halide ions. In some examples, the halide ion may include an ion of at least one of I, Br, Cl, or F (e.g., X may be I, Br, Cl, or F), and the metal ion may include an ion of at least one of Li, Mg, Zn, Al or Na (e.g., M may be Li, Mg, Zn, Al or Na). In other examples, the metal halide may include elements other than I, Br, Cl, F, Li, Mg, Zn and/or Na. In some embodiments, the metal halide may provide the electrolyte 14 with additional ionic conductivity.

In various embodiments, the electrolyte 14 includes one or more solvents capable of transporting the metal ions and counter ions. In various embodiments, which are not intended to be limiting, suitable solvents may be chosen from non-aqueous, organic solvents such as an ether, a glyme, a carbonate, a nitrile, an amide, an amine, an organosulfur solvent, an organophosphorus solvent, an organosilicon solvent, a fluorinated solvent, adiponitrile (ADN), propylene carbonate (PC), dimethoxyethane (DME), and mixtures and combinations thereof.

In some examples, one or more additional solvents may be included in the electrolyte 14 to further improve the electrochemical performance of battery 10, such as, for example, by enhancing rechargeability, cyclability, or the like.

In one embodiment, which is not intended to be limiting, the solvent in the electrolyte 14 includes an optional heterocyclic compound, which in this application refers to an aromatic or non-aromatic cyclic compound having as ring members atoms of at least two different elements. A cyclic compound (ring compound) as used in the present application refers to a compound in which one or more series of atoms in the compound is connected to form a ring. In various embodiments, suitable cyclic compounds for the electrolyte 14 include 5-membered rings such as pyrrolidines, oxolanes, thiolanes, pyrroles, furans and thiophenes; 6-membered rings such as piperadines, oxanes, thianes, pyridines, pyrans and thiopyrans; and 7-membered rings such as azepanes, oxepanes, thiepanes, azepines, oxepines, and thiepenes. Examples of suitable heterocyclic compounds include, but are not limited to, tetrahydrofuran, tetrahydropyran, tetrahydrothiophene, oxathiolane, succinimide, oxazolidone, γ-butyrolactone, γ-caprolactone, ε-caprolactone, γ-valerolactone, pyrrolidine, imidazolidine, sulfolane, thiane, dioxolane, and mixtures and combinations thereof. In some embodiments, suitable heterocyclic compounds include, but are not limited to, cyclic ethers, cyclic esters, and mixtures and combinations thereof.

In some examples, the electrolyte 14 includes substantially equal parts of the solvent including the heterocyclic compound and the one or more additional solvents.

In another embodiment, which is not intended to be limiting, the solvent in the electrolyte 14 includes an optional nitrile compound. The nitrile compound has the chemical formula of N≡C—R or N≡C—R—C≡N, where R is an organic functional group. Examples of organic functional groups for the nitrile compound include ethers, alkyls ethers, thioethers, alkyl thioethers, or the like. In some examples, which are not intended to be limiting, the nitrile compound is chosen from valeronitrile, nonanenitrile, hexanenitrile, acetonitrile, propionitrile, glutaronitrile, methoxyacetonitrile (MAN), methoxybenzonitrile, methoxypropionitrile (e.g., 3-methoxypropionitrile (MPN)), methylglutaronitrile, butoxypropionitrile, butoxybenzonitrile, and mixtures and combinations thereof. In some examples, the nitrile compound in the electrolyte 14 may improve electrochemical performance (e.g., reversibility, rechargeability, and/or cyclability), produce fewer irreversible carbonate byproducts, or improve power density.

In some examples, the electrolyte 14 includes equal parts of the solvent including the nitrile compound and the one or more additional solvents.

The electrolyte 14 includes an oxidizing gas. In some examples, electrolyte 14 may be in the presence of an oxidizing gas, and the phrase "includes an oxidizing gas" is intended to include such a configuration. In some examples, the oxidizing gas may be dissolved in the solvent including the electrolyte 14. In some examples, which are not intended to be limiting, the oxidizing gas includes at least one of oxygen, air, nitric oxide, or nitrogen dioxide. The oxidizing gas helps induce the redox reactions of battery 10 as described above, and helps achieve highly reversible redox reactions, which may contribute to enhanced electrochemical performance of battery 10. The oxidizing gas may help induce such redox reactions, and contribute to the consolidation and stabilization of a solid-electrolyte interphase (SEI) layer on the electrode 12, 16, but is not consumed or evolved during use of battery 10 (e.g., the oxidizing gas does not participate in the redox reactions of battery 10). In some examples, an electrolyte lacking the oxidizing gas may exhibit little or no rechargeability.

The cathode 16 collects electrons generated by a redox reaction during discharge of battery 10 and provides a conductive path to an external electrical circuit to which battery 10 is connected. Similarly, during recharge of battery 10, the cathode 16 provides an electrical pathway between an external voltage source and electrolyte 14 to supply voltage for another redox reaction to charge battery 10.

The cathode 16 includes an electrically conductive material and a metal halide salt incorporated into or applied on the electrically conductive material. In various embodiments, the total amount of metal halide in the cathode 16 is greater than the amount of metal halide in the electrolyte 14, or at least twice the total amount of the metal halide in the electrolyte 14, or 3 times the amount, or 5 times the amount.

In some examples, which are not intended to be limiting, the electrically conductive material in the cathode 16 may include an electrically conductive powder independently selected from metal and/or carbon powders, woven or non-woven metal fibers, metal foam, woven or non-woven carbon fibers, or the like. Additionally, or alternatively, the cathode 16 may include stainless-steel mesh, aluminum (Al) mesh, nickel (Ni) foam, carbon cloth and/or carbon paper. For example, in one embodiment, the cathode 16 may include a stainless-steel mesh with carbon nanoparticles deposited thereon.

In another embodiment, the cathode 16 may be a porous material that is electrically conductive. In one embodiment, the cathode 16 can include carbon materials selected from an amorphous carbon material, a crystalline carbon material, and mixtures and combinations thereof. Suitable amorphous carbon materials include, but are not limited to, particles of carbon black and porous glassy carbon, and mixtures and combinations thereof. In some embodiments, the crystalline carbon material includes, but is not limited to, graphene, graphene oxide, reduced graphene oxide, carbon nanotube and mixtures and combinations thereof.

In some embodiments, the cathode 16 may include an optional powder of a material such as, for example, lithium cobalt oxide (LCO, e.g., $LiCoO_2$), nickel cobalt aluminum (NCA, e.g., $LiNi_xCo_yAl_zO_2$, $LiNi_{0.8}Co_{0.15}Al_{0.05}O_2$), lithium ion manganese oxide (LMO, e.g., $LiMn_2O_4$), lithium nickel manganese cobalt oxide (NMC, e.g., $LiNiMnCoO_2$), nickel cobalt manganese (NCM, e.g., $LiNi_xCo_yMn_zO_2$, $LiNi_{0.33}Co_{0.33}Mn_{0.33}O_2$) or lithium iron phosphate (LFP, e.g., $LiFePO_4$), and mixtures and combinations thereof.

The cathode 16 includes at least one metal halide salt $MX_n$, where M is a metal, X is a halogen, and n is an integer greater than 0. In some examples, the metal halide includes an ion of at least one of I, Br, Cl, or F (e.g., X may be I, Br, Cl, or F), and the metal ion may include an ion of at least one of Li, Mg, Zn, Al or Na (e.g., M may be Li, Mg, Zn, Al or Na). In other examples, the metal halide may include elements other than I, Br, Cl, F, Li, Mg, Zn, Al and/or Na.

In some embodiments, the cathode 16 may optionally include a polymeric binder. Suitable polymeric binders may vary widely, and examples include, but are not limited to, poly(tetrafluoroethylene)(PTFE), polyvinylidene fluoride (PVDF) or sulfonated tetrafluoroethylene based fluoropolymer-copolymers available from DowDuPont, Midland, Mich., under the trade designation NAFION, and mixtures and combinations thereof.

In some embodiments, the cathode optionally includes a halogen diatomic molecule. Suitable halogen diatomic molecules include $I_2$, $Br_2$, $Cl_2$, and $F_2$.

In various embodiments, the cathode 16 includes about 25 wt % of the electrically conductive material, about 70 wt % of the metal halide salt, and about 5 wt % of the optional polymeric binder, based on the total weight of the cathode 16. For example, in some embodiments, the cathode 16 includes about 50 wt % to about 80 wt % of the metal halide, or about 40 wt % to about 90 wt %, or about 30 wt % to about 100 wt %, or about 10 wt % to about 100 wt %, based on the total weight of the cathode 16.

In various embodiments, the metal halide in the cathode 16 may be interspersed or distributed throughout a matrix of the electrically conductive material and any polymeric binder present. In some embodiments, the electrically conductive material itself may be a porous material, and the metal halide salt may be located in a plurality of the pores therein. In some embodiments, the metal halide may also be adsorbed into the electrically conductive material and/or the polymeric binder, in addition to being located in the pores. In some embodiments, the metal halide salt forms a gradient in the electrically conductive matrix material or may be concentrated near a major surface 19 of the cathode to form on or more metal halide rich layers 17.

In some examples, the battery 10 includes an optional separator 18. The separator 18 forces electrons through an external electrical circuit to which battery 10 is connected such that the electrons do not travel through battery 10 (e.g., through electrolyte 14 of battery 10), while still enabling the metal ions to flow through battery 10 during charge and discharge. In some examples, the separator 18 may be soaked with electrolyte 14, within electrolyte 14, surrounded by electrolyte 14, or the like. The separator 18 may include an electrically non-conductive material to prevent movement of electrons through battery 10 such that the electrons move through the external circuit instead. For example, separator 18 may include glass, non-woven fibers, polymer films, rubber, or the like.

In some examples, the battery 10 has a closed or substantially closed volume. For example, anode 12, electrolyte 14, the cathode 16, and separator 18 may be within a closed or substantially closed cell or other enclosure. In this way, the oxidizing gas of electrolyte 14 remains within the battery 10 such that the battery 10 has a relatively fast charging rate, high energy efficiency, high power density, high reversibility, high cyclability, or combinations thereof, as described herein.

The battery 10 may be capable of undergoing many charging and discharging cycles (e.g., exhibits good rechargeability), even at relatively high charging densities. In some examples, battery 10 is capable of completing at least 100 cycles of charging and discharging at a current density of greater than or equal to about 1 $mA/cm^2$, about 5 $mA/cm^2$, about 10 $mA/cm^2$, or about 20 $mA/cm^2$. As one example, battery 10 may be capable of completing at least 1000 cycles of charging and discharging at a current density of greater than or equal to about 1 $mA/cm^2$, about 5 $mA/cm^2$, about 10 $mA/cm^2$, or about 20 $mA/cm^2$.

Additionally, or alternatively, the battery 10 may exhibit a relatively high energy efficiency. For example, battery 10 may exhibit an energy efficiency of greater than or equal to 90% at a current density of greater than or equal to about 1 $mA/cm^2$, about 5 $mA/cm^2$, about 10 $mA/cm^2$, or about 20 $mA/cm^2$. In some examples, battery 10 may exhibit an energy efficiency of greater than or equal to 99% at a current density of greater than or equal to about 1 $mA/cm^2$, about 5 $mA/cm^2$, about 10 $mA/cm^2$, or about 20 $mA/cm^2$.

Figure 2:
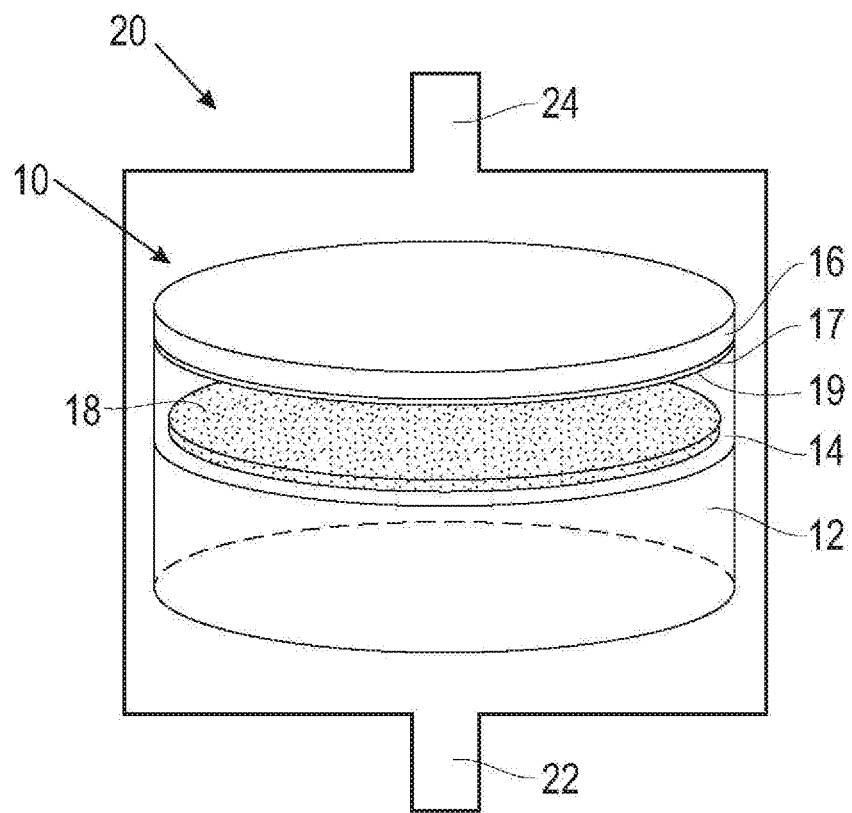
FIG. 2 is a conceptual diagram illustrating the example battery of FIG. 1 within an enclosed cell.

FIG. 2 is a conceptual diagram illustrating the example battery 10 of FIG. 1 within an enclosed cell system 20. The enclosed cell system 20 may include a cell that houses battery 10 during operation of battery 10, a cell used to fabricate battery 10, or both. For example, enclosed cell system 20 may include a cell available from Swagelok of Solon, Ohio, under the trade designation SWAGELOK, and may be used to fabricate battery 10. In some examples, enclosed cell system 20 may include an inlet tube 22 and/or an outlet tube 24. Inlet tube 22 and outlet tube 24 may be used to introduce and remove air or other gases, such as the oxidizing gas of electrolyte 14, into and out of the enclosed cell.

In one example embodiment, to fabricate the cathode 16, powders of the electrically conductive material, the metal halide, and any optional polymeric binder are simply mixed together to form a slurry. In some embodiments, an optional solvent may be used to adequately disperse the powders. The slurry is then cast on a surface of the separator 18 or any type of mesh, which may be referred to herein as a gas diffusion layer (GDL), and dried to form the cathode 16. In various non-limiting embodiments, the slurry may be air-dried, dried in an oven, or a combination thereof.

In some examples, the metal halide may itself be dried prior to being incorporated into the slurry. In one non-limiting example, the metal halide may be dried on a hotplate in an argon filled glovebox at about 120° C. for greater than 12 hours.

To make a battery cell, anode 12, optional separator 18 with the cathode 16 formed thereon are stacked together. In some embodiments, the optional separator is soaked with the electrolyte solution 14, or the electrolyte solution 14 is placed in the cell between the anode 12 and the cathode 16, or both. After anode 12, separator 18 soaked with the solution, and cathode 16 have been stacked, the enclosed cell system 20 may be closed or substantially closed to form a closed or substantially closed volume around anode 12, separator 18 soaked with the solution, and cathode 16.

An oxidizing gas is then introduced into enclosed cell system 20 to fabricate battery 10. In some examples, introducing the oxidizing gas to enclosed cell system 20 includes introducing the oxidizing gas to the enclosed cell 20 via an inlet tube 22 (FIG. 2). In some examples, the enclosed cell system 20 may include or be in the presence of an inert gas, such as argon, prior to introducing the oxidizing gas to enclosed cell system 20. In some such examples, introduction of the oxidizing gas may purge and completely replace the inert gas within enclosed cell system 20 with the oxidizing gas. For example, the oxidizing gas may be introduced to the enclosed cell 20 via the inlet tube 22, and the inert gas may be purged through an outlet tube 24. In some examples, the concentration of the oxidizing gas in the enclosed cell system 20 may be between about 5 wt % and about 100 wt %, about 50 wt % and about 100 wt %, or about 80 wt % and about 100 wt % of the total amount of gases within enclosed cell system 20, e.g., the total amount of the oxidizing gas and the inert gas within enclosed cell system 20.

The present disclosure will now be described with respect to the following non-limiting examples.

EXAMPLES

Example 1

Preparation of Electrolyte, Cathode and Cell Assembly

Lithium iodide (LiI) and lithium nitrate (LiNO$_3$) salts were placed in separate vials and dried on a hot plate inside an argon filled glovebox (<0.1 ppm H$_2$O, O$_2$) at 120° C. for 1 hour. Three organic solvents, adiponitrile (ADN), 3-methoxypropionitrile (MPN) and 1,2-dimethoxyethane (DME), were selected and purified with a molecular sieve (3 Å) overnight. 1 mL of ADN, 1 mL of MPN, and 1 mL of DME were mixed and stirred in a vial with a magnetic bar. With this mixed solvent, two different electrolyte solutions were prepared: (1) 1 M LiNO$_3$; 1M LiNO$_3$; and (2) 0.1 M LiI dissolved in ADN-MPN-DME (1:1:1 in a volume ratio).

Subsequently, the fabrication of the cathode began with a gas diffusion layer (GDL) of a carbon cloth and a slurry solution including a carbon black powder and a polymeric binder including PTFE. In some cases, the slurry solution included lithium iodide.

The prepared slurry solution was simply drop-casted and coated on top of the GDL and dried overnight in a 70° C. vacuum oven.

Cell assembly started with placing lithium metal foil anode on top of the anode current collector. The electrolyte solution was dropped onto an electrically insulating separator membrane sitting on top of the lithium metal anode, and then the prepared cathode was placed on the separator. The separator was always in between the anode and the cathode.

The amount of lithium iodide deposited on the carbon cathode was greater than twice the amount of the lithium iodide used and dissolved in the electrolyte solution. All cell assembly was done in an argon filled glovebox. All cell components were placed within a Swagelok-type cell equipped with both inlet and outlet tubing for oxygen flow. Oxygen was then introduced from the inlet tubing outside of the argon filled glovebox, purged and completely replaced the argon gas inside the cell.

Example 2

Rechargeable Battery with Solid-Phase Lithium Iodide Cathode (Low Loading of Lithium Iodide, Solubility X2)

Figure 3A:
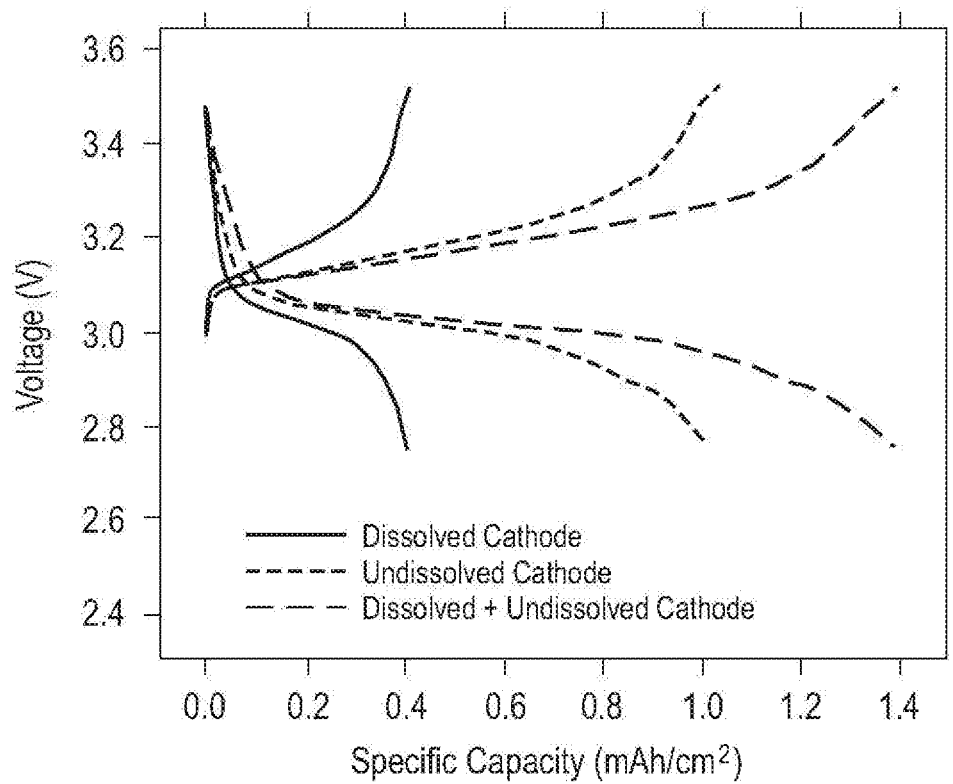
FIGS. 3A-3B are plots of the discharge and charge cycling profiles of the first cycle at current density of 1 mA/cm$^2$ using 1M LiNO3-0.1M LiI MPN-ADN-DME (1:1:1) electrolyte solution for cells containing dissolved and/or undissolved cathode and 1M LiNO$_3$ MPN-ADN-DME (1:1:1) for a cell containing an undissolved cathode.
Figure 3B:
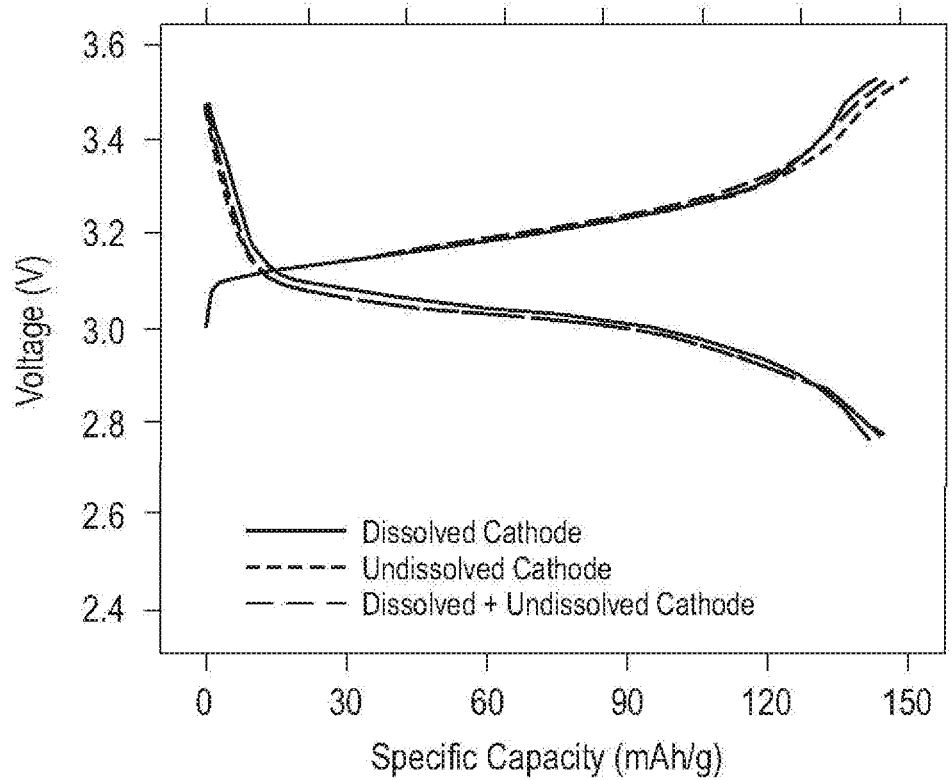

FIGS. 3A-3B show the charge and discharge cycle behavior of the cells containing lithium iodide dissolved in the electrolyte and/or deposited on the carbon cathode at the current density of 1 mA/cm$^2$. In the plots of FIGS. 3A-3B, the cell that used the lithium iodide deposited carbon cathode is labeled as the "Undissolved Cathode," and the cell that used lithium iodide dissolved in the electrolyte is labeled as the "Dissolved Cathode."

As presented in FIG. 3A, 3.5 mg of the undissolved lithium iodide cathode resulted in about 1.0 mAh/cm$^2$ of specific capacity, whereas 1.4 mg of the dissolved lithium iodide cathode showed about 0.4 mAh/cm$^2$ of specific capacity. It is noteworthy that the 1.4 mg of the lithium iodide is the maximum amount that can be dissolved in the given volume (~75 μL) of the electrolyte solution that was added in each cell.

Re-plotting FIG. 3A with respect to the gravimetric specific capacity instead of areal specific capacity led to FIG. 3B, showing that both the charge and discharge gravimetric capacities of all three different types of cells were near identical. Even though the amount of the undissolved lithium iodide was more than twice that of the dissolved lithium iodide, FIG. 3B showed that the discharge gravimetric capacity of the undissolved lithium iodide cathode was slightly higher than that of the dissolved lithium iodide.

Example 3

Rechargeable Battery with Solid-Phase Lithium Iodide Cathode (High Loading of Lithium Iodide, Solubility X10)

Figure 4:
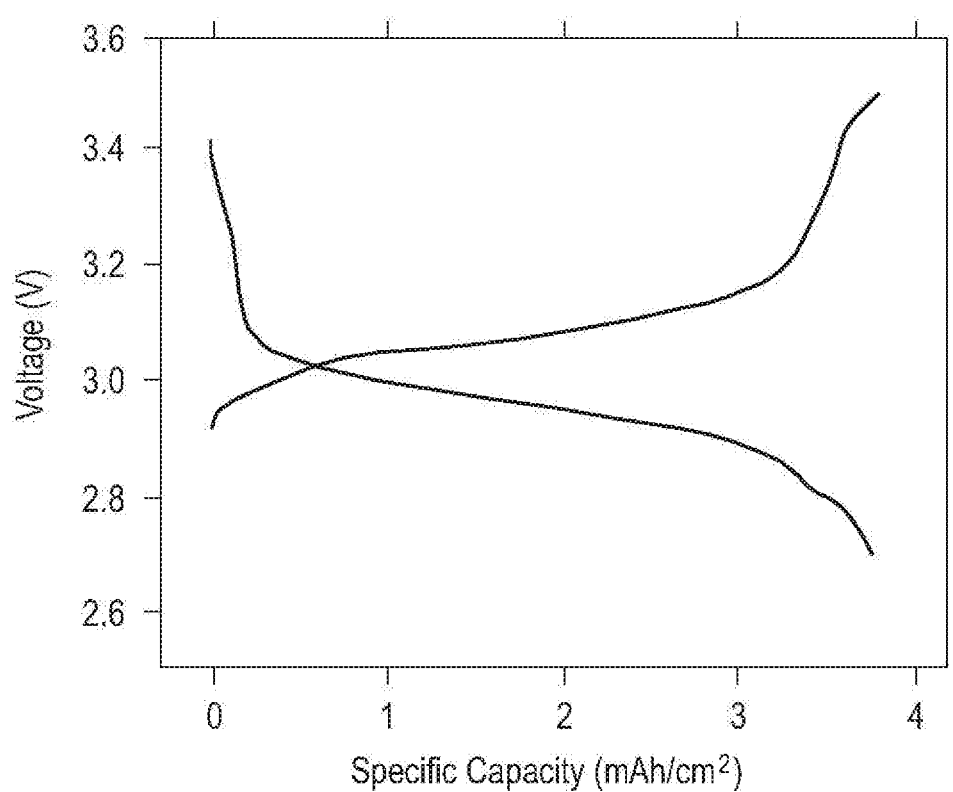
FIG. 4 is a plot of the discharge and charge cycling profile using a 1M LiNO3 MPN-ADN-DME (1:1:1) electrolyte solution in a cell containing 15 mg of undissolved lithium iodide deposited on the carbon cathode.

The use of about 15 mg of the undissolved lithium iodide, which is more than 10 times the maximum molar concentration of lithium iodide salt in the same amount of electrolyte solution (about 75 μL) deposited on the carbon cathode, produced about 4 mAh/cm$^2$ of specific capacity as demonstrated in FIG. 4. This result is almost proportional to the specific capacity produced with 3.5 mg of the undissolved lithium iodide used in Example 2.

This example further confirms and validates the capability of the cell in utilizing the solid-phase lithium iodide deposited on the carbon cathode. Despite high loading of the undissolved lithium iodide, the cell maintained excellent energy efficiency (>90%) as shown in FIG. 4.

Various embodiments have been described. These and other embodiments are within the scope of the following claims.

What is claimed is:
1. A battery, comprising:
an anode;

an electrolyte comprising a solvent and at least one ion conducting salt; and a cathode comprising a metal halide salt incorporated into an electrically conductive material, wherein the electrolyte is in contact with the anode, the cathode, and an oxidizing gas.

2. The battery of claim 1, wherein the total amount of the metal halide salt in the cathode exceeds the amount of the metal halide salt that is dissolvable in the electrolyte.

3. The battery of claim 1, wherein the total amount of the metal halide salt in the cathode is greater than twice the amount of the metal halide salt that is dissolvable in the electrolyte.

4. The battery of claim 1, wherein the electrically conductive material comprises porous carbon selected from the group consisting of carbon black, carbon nanotubes, carbon nanofibers, activated carbon, amorphous carbon, graphite, graphene, and mixtures and combinations thereof.

5. The battery of claim 1, wherein the electrically conductive material comprises a porous material, and the metal halide is incorporated into a plurality of pores of the porous material.

6. The battery of claim 5, wherein the metal halide salt is interspersed within the electrically conductive material.

7. The battery of claim 5, wherein the metal halide salt is adsorbed onto the electrically conductive material.

8. The battery of claim 1, wherein the cathode comprises a halogen diatomic molecule selected from the group consisting of I2, Br2, Cl2, and F2.

9. The battery of claim 1, wherein the cathode comprises a polymeric binder.

10. The battery of claim 9, wherein the polymeric binder is selected from the group consisting of polytrifluoroethylene (PTFE), polyvinylidene fluoride (PVDF), and mixtures and combinations thereof.

11. The battery of claim 1, further comprising a separator between the anode and the cathode.

12. The battery of claim 1, wherein the oxidizing gas is selected from the group consisting of oxygen, air, nitric oxide, nitrogen dioxide, and mixtures and combinations thereof.

13. The battery of claim 1, wherein the electrolyte is non-aqueous.

14. The battery of claim 1, wherein the solvent in the electrolyte is selected from the group consisting of tetrahydrofuran, tetrahydropyran, tetrahydrothiophene, oxathiolane, oxolane, dioxolane, succinimide, oxazolidone, γ-butyrolactone, γ-caprolactone, ε-caprolactone, γ-valerolactone, pyrrolidine, imidazolidine, sulfolane, thiane, valeronitrile, nonanenitrile, hexanenitrile, acetonitrile, propionitrile, glutaronitrile, methoxyacetonitrile, methoxybenzonitrile, methoxypropionitrile, methylglutaronitrile, butoxypropionitrile, butoxybenzonitrile, and mixtures and combinations thereof.

15. The battery of claim 14, wherein the solvent in the electrolyte comprises a heterocyclic compound selected from the group consisting of cyclic ethers, cyclic esters, and mixtures and combinations thereof.

16. The battery of claim 14, wherein the solvent in the electrolyte comprises a nitrile compound.

17. The battery of claim 1, wherein the ion conducting salt comprises (i) a metal ion selected from the group consisting of Li, Mg, Zn, Al and Na, and mixtures and combinations thereof and (ii) an anion selected from the group consisting of nitrate (NO3-), hexafluorophosphate (PF6-), tetrafluoroborate (BF4-), bisoxalato borate (BOB-), and difluorooxalato borate (DFOB-), trifluoromethanesulfonate (TF-), trifluorosulfonylimide (TFSI-), and mixtures and combinations thereof.

18. The battery of claim 1, wherein the anode is made from a material selected from the group consisting of metals, metalloids, nonmetals and mixtures and combinations thereof.

19. The battery of claim 18, wherein the anode is a metal selected from the group consisting of Li, Mg, Zn, Al, Na, and mixtures and combinations thereof.

20. The battery of claim 18, wherein the anode is a metalloid selected from the group consisting of Si, Ge, Sb, and mixtures and combinations thereof.

21. The battery of claim 18, wherein the nonmetal comprises carbon.

22. The battery of claim 1, wherein the metal halide salt comprises (i) an ion of at least one of I, Br, Cl, and F, and (ii) the metal ion comprises an ion of at least one of Li, Mg, Zn, Al and Na.

23. The battery of claim 1, further comprising an anode current collector contacting the anode, wherein the anode current collector is selected from the group consisting of copper, copper oxide, zinc, zinc oxide, nickel oxide, and mixtures and combinations thereof.

24. The battery of claim 1, further comprising a cathode current collector contacting the cathode, wherein the cathode current collector is selected from the group consisting of aluminum, titanium, molybdenum, chromium, iron, nickel, stainless steel, and mixtures and combinations thereof.

* * * * *